(12) United States Patent
Lessard

(10) Patent No.: US 10,252,657 B2
(45) Date of Patent: Apr. 9, 2019

(54) HEADREST WITH ADJUSTABLE SIDE ELEMENTS

(71) Applicant: BOMBARDIER INC., Dorval (CA)

(72) Inventor: David Lessard, Montreal (CA)

(73) Assignee: BOMBARDIER INC., Dorval (CA)

( * ) Notice: Subject to any disclaimer, the term of this patent is extended or adjusted under 35 U.S.C. 154(b) by 0 days.

(21) Appl. No.: 15/533,408

(22) PCT Filed: Dec. 4, 2015

(86) PCT No.: PCT/IB2015/059372
§ 371 (c)(1),
(2) Date: Jun. 6, 2017

(87) PCT Pub. No.: WO2016/092440
PCT Pub. Date: Jun. 16, 2016

(65) Prior Publication Data
US 2017/0368970 A1    Dec. 28, 2017

Related U.S. Application Data

(60) Provisional application No. 62/091,133, filed on Dec. 12, 2014.

(51) Int. Cl.
*B60N 2/885* (2018.01)
*B60N 2/888* (2018.01)

(52) U.S. Cl.
CPC .............. *B60N 2/885* (2018.02); *B60N 2/888* (2018.02)

(58) Field of Classification Search
CPC ..................................................... B60N 2/885
See application file for complete search history.

(56) References Cited

U.S. PATENT DOCUMENTS

| 4,042,791 A | 8/1977 | Wiseman |
| 4,130,318 A * | 12/1978 | Hemmen ............... B60N 2/815 297/410 |
| 4,205,878 A * | 6/1980 | Wooten .................... A47C 7/38 297/391 |

(Continued)

FOREIGN PATENT DOCUMENTS

| CN | 2752102 Y | 1/2006 |
| CN | 201800581 U | 4/2011 |

(Continued)

OTHER PUBLICATIONS

PCT international Search Report and Written Opinion dated Mar. 10 2016 re: International Application No. PCT/IB2015/059372.

(Continued)

*Primary Examiner* — Timothy J Brindley
(74) *Attorney, Agent, or Firm* — Norton Rose Fulbright Canada LLP

(57) ABSTRACT

A headrest for a seat of a vehicle includes a body securable to the seat, a side portion adjacent the body, a receiver pivotally attached to the body, a slide attached to the side portion so as to be movable along the receiver between a first position in which the side portion is in a retracted position and a second position in which the side portion is in an extended position, and a friction member on one of the receiver and the slide. A securing mechanism causes the friction member to hold the slide in a selected position relative to the receiver.

30 Claims, 5 Drawing Sheets

(56) References Cited

U.S. PATENT DOCUMENTS

| | | | |
|---|---|---|---|
| 5,904,405 A * | 5/1999 | Wu | B60N 2/885 297/391 |
| 6,120,099 A | 9/2000 | Reikeras et al. | |
| 6,513,871 B2 | 2/2003 | Bartels | |
| 7,144,083 B2 * | 12/2006 | List | B60N 2/885 297/391 |
| 7,264,313 B2 * | 9/2007 | Clough | A47C 7/38 297/407 |
| 7,871,129 B2 | 1/2011 | Boes et al. | |
| 8,295,535 B2 * | 10/2012 | Tracy | B64D 11/0015 297/217.4 |
| 8,950,813 B2 * | 2/2015 | Nawaz | B60N 2/806 297/406 |
| 9,446,694 B2 * | 9/2016 | Szczygiel | B60N 2/4882 |
| 2001/0026090 A1 | 10/2001 | Bartels | |
| 2005/0121963 A1 | 6/2005 | Williamson et al. | |
| 2006/0131947 A1 | 6/2006 | List et al. | |
| 2007/0108827 A1 | 5/2007 | Clough | |
| 2007/0228792 A1 | 10/2007 | Chen et al. | |
| 2009/0001798 A1 | 1/2009 | Park | |
| 2009/0008973 A1 | 1/2009 | Browne et al. | |
| 2009/0302660 A1 | 12/2009 | Karlberg et al. | |
| 2012/0139309 A1 | 6/2012 | Gaither et al. | |
| 2013/0278028 A1 | 10/2013 | Gaeng et al. | |
| 2016/0272327 A1 * | 9/2016 | Baker | B60N 2/885 |
| 2017/0197529 A1 * | 7/2017 | Hontz | B64D 11/0646 |
| 2017/0267138 A1 * | 9/2017 | Subat | B60N 2/879 |

FOREIGN PATENT DOCUMENTS

| | | |
|---|---|---|
| CN | 202827217 U | 3/2013 |
| CN | 203331885 U | 12/2013 |
| DE | 20204949 U1 | 6/2003 |
| DE | 1020070038063 A1 | 2/2009 |
| DE | 102007041034 B4 | 12/2010 |
| EP | 1449713 B1 | 1/2012 |
| FR | 2932429 A1 | 12/2009 |

OTHER PUBLICATIONS

English translation of Abstract and claims of German patent document No. DE 20204949U1 dated Jun. 12, 2003, accessed on May 15, 2017, https://www.google.ca/patents/DE20204949U1?cl=en&dq=de+20204949&hl=en&sa=X&ved=0ahUKEwiy4cWWovLTAhXmxlQKHUnsDqUQ6AEIJjAA.

English translation of France patent document No. FR 2932429 A1 dated Dec. 18, 2009, accessed on May 15, 2017, https://www63.orbit.com/?locale=en&ticket=bc898bb7-aa7e-4198-aad0-64fe95dad8e9&embedded=false#PatentDocumentPage.

English translation of German patent document No. DE102007039063A1 dated Feb. 19, 2009, EPO Patent Translate Powered by EPO and Google, accessed on Oct. 27, 2014.

English translation of Chinese patent document No. CN202827217U dated Mar. 27, 2013, accessed on Jun. 1, 2017, https://www.google.com.na/patents/CN202827217U?cl=en&dq=CN202827217U.

English translation of Europe patent document No. EP1449713B1 dated Jan. 18, 2012, EPO Patent Translate Powered by EPO and Google, accessed on Oct. 27, 2014.

The State Intellectual Property Office of the People's Republic of China, Notification of First Office Action dated Jul. 16, 2018 re: application No. 201580067097.0.

English translation of China patent document No. CN2752102Y dated Jan. 18, 2006, https://patents.google.com/patent/CN2752102Y/en?oq=CN2752102Y, accessed on Aug. 13, 2018.

English translation of China patent document No. CN201800581U dated Apr. 20, 2011, https://patents.google.com/patent/CN2752102Y/en?oq=CN2752102Y, accessed on Aug. 13, 2018.

English translation of China patent document No. CN203331885U dated Dec. 11, 2013, https://patents.google.com/patent/CN203331885U/en?oq=CN203331885u, accessed on Aug. 13, 2018.

English translation of German patent document No. DE102007041034B4 dated Dec. 9, 2010, https://patents.google.com/patent/DE102007041034B4/en?oq=DE102007041034B4, accessed on Aug. 13, 2018.

* cited by examiner

HEADREST WITH ADJUSTABLE SIDE ELEMENTS

CROSS-REFERENCE TO RELATED APPLICATION(S)

This application is a national phase application under 35 U.S.C. 371 of International Patent Application No. PCT/IB2015/059372 filed on Dec. 4, 2015, which claims priority from U.S. provisional patent application No. 62/091,133, filed on Dec. 12, 2014, the entire contents of which are hereby incorporated by reference.

TECHNICAL FIELD

The present disclosure concerns a headrest for a vehicle seat. Specifically, the present disclosure concerns a movable flexwing headrest.

DESCRIPTION OF THE RELATED ART

A wide variety of types of seats have been incorporated into commercial, business and private aircraft. Most coach class aircraft seats in typical commercial aircraft are adjustable among at least two positions such as an upright taxi, take-off and landing position ("TTL" or "TT&L") and a reclined position. First-class seating may be further adjustable. In business and private aircraft, seats may also be moved among positions such as TTL, reclined, a more reclined "napping" position, and a fully reclined "sleeping" position.

Some aircraft seats include adjustable headrests. Such headrests may be slidable vertically relative to the seatback, for example, to allow different height passengers to find a comfortable orientation for the headrest. Also, headrests may pivot forward or backward relative to the seatback. Such pivoting adjustment may be utilized by a passenger when the seat position is changed. For example, a passenger may wish to pivot the headrest forward after moving a seat from a TTL position to an inclined resting or sleeping position.

Some headrests have side portions, sometimes called "flexwings," that can move relative to a central portion of the headrest between a rearward, retracted position and a forward, deployed position. In the forward position, the flexwings can cradle and support sides of the passenger's head for comfort, napping or safety. Some flexwings may also be releasably fixable in positions between the rearward and forward positions. Many presently available headrests with flexwings have substantially vertical friction hinges to allow the flexwings to pivot relative to the central portion of the headrest. The friction hinges releasably secure the flexwings in a desired orientation.

Although presently available seats and flexwing headrests seats are suitable for their intended applications in various types of aircraft, improvements to the adjustability, functionality, reliability, cost and comfort of headrests would be welcome.

SUMMARY

The present disclosure seeks to improve upon seats and headrests that are known in the prior art by introducing and combining a number of new and unique features, which are detailed in the paragraphs that follow.

According to certain aspects of the disclosure, a headrest for a seat of a vehicle may include a body securable to the seat, a side portion adjacent the body, a receiver pivotally attached to the body, a slide attached to the side portion so as to be movable along the receiver between a first position in which the side portion is in a retracted position and a second position in which the side portion is in an extended position, a friction member on one of the receiver and the slide, and a securing mechanism attached to the body for causing the friction member to hold the slide in a selected position relative to the receiver. Various options and modifications are possible.

For example, the slide and/or the receiver may be arcuate. Also, the receiver may include two arcuate members on opposite sides of the slide.

If desired, the securing mechanism may include a spring member. The spring member may provide a force urging the receiver to pivot around a pivot point spaced from the spring member, and may also provide a force substantially normal to the receiver proximate the friction member.

The body may have a front surface and the side portion has a front surface, the front surfaces of the body and side portion being substantially planar when the side portion is in the retracted position and the front surface of the side portion being at an angle to the front surface of the body when the side portion is in the extended position. The side portion may comprise a first side portion, the receiver may comprise a first receiver, the slide may comprise a first slide and the securing mechanism may comprise a first securing mechanism all located on a first lateral side of the body. If so, the headrest may further comprise a second side portion, a second receiver, a second slide and a second securing mechanism all located on a second lateral side of the body. The first and second side portions may be independently movable relative to the body.

The device may further include a pivot arm having a first end attached to the side portion and a second end attached to the body spaced from a front surface of the body, the side portion pivoting relative to the body via the pivot arm when the slide moves relative to the receiver.

According to certain other aspects of the disclosure, a headrest for a seat of a vehicle may include a body securable to the seat, a side portion adjacent the body, a receiver attached to the body, a slide attached to the side portion so as to be movable along the receiver between a first position in which the side portion is in a retracted position and a second position in which the side portion is in an extended position, and a pivot arm having a first end attached to the side portion and a second end attached to the body spaced from a front surface of the body. The side portion may pivot relative to the body via the pivot arm when the slide moves relative to the receiver. As above, various options and modifications are possible.

For example, the slide and/or the receiver may be arcuate. Also, the receiver may include two arcuate members on opposite sides of the slide. If desired, a securing mechanism may be attached to the body for urging together the slide the receiver to hold the slide in a position relative to the receiver. The securing mechanism may include a spring member providing a force substantially normal to the receiver.

The side portion may have a front surface, wherein the front surfaces of the body and side portion are substantially planar when the side portion is in the retracted position and the front surface of the side portion is at an angle to the front surface of the body when the side portion is in the extended position. The side portion may comprises a first side portion, the receiver may comprise a first receiver, the slide may comprise a first slide and the pivot arm may comprise a first pivot arm all located on a first lateral side of the body. The headrest may further comprise a second side portion, a second receiver, a second slide and a second pivot arm all located on a second lateral side of the body. The first and second side portions are independently movable relative to the body.

According to certain other aspects of the disclosure, a headrest for a seat of a vehicle may include a body securable to the seat, a side portion adjacent the body, a receiver pivotally attached to the body, a slide attached to the side portion so as to be movable along the receiver between a first position in which the side portion is in a retracted position and a second position in which the side portion is in an extended position, and a positioning mechanism configured to restrict movement of the side portion relative to the body when a force is applied to the side portion in a direction not substantially along the slide. Again, various options and modifications are possible.

For example, the positioning mechanism may include a securing mechanism attached to the body for urging together the slide and the receiver to hold the slide in a position relative to the receiver. Also, the securing mechanism may include a spring member providing a force substantially normal to the receiver. The positioning mechanism may further include a friction member on one of the receiver and the slide for holding the slide relative to the receiver when the securing mechanism is active.

The slide and/or the receiver may be arcuate. Also, the receiver may include two arcuate members on opposite sides of the slide.

The side portion may have a front surface, wherein the front surfaces of the body and side portion are substantially planar when the side portion is in the retracted position and the front surface of the side portion are at an angle to the front surface of the body when the side portion is in the extended position. The side portion may comprise a first side portion, the receiver may comprise a first receiver, and the slide may comprise a first slide all located on a first lateral side of the body. The headrest may further comprise a second side portion, a second receiver and a second slide all located on a second lateral side of the body. A pivot arm may be provided having a first end attached to the side portion and a second end attached to the body spaced from a front surface of the body, the side portion pivoting relative to the body via the pivot arm when the slide moves relative to the receiver.

The positioning mechanism may be configured to permit movement of the side portion relative to the body when a force is applied to the side portion in a direction substantially along the slide.

Still further aspects of the present disclosure will be made apparent from the discussion provided below.

BRIEF DESCRIPTION OF THE DRAWINGS

The present disclosure will now be described in connection with the drawings appended hereto, in which.

DETAILED DESCRIPTION OF EMBODIMENT(S) OF THE DISCLOSURE

Figure 1:
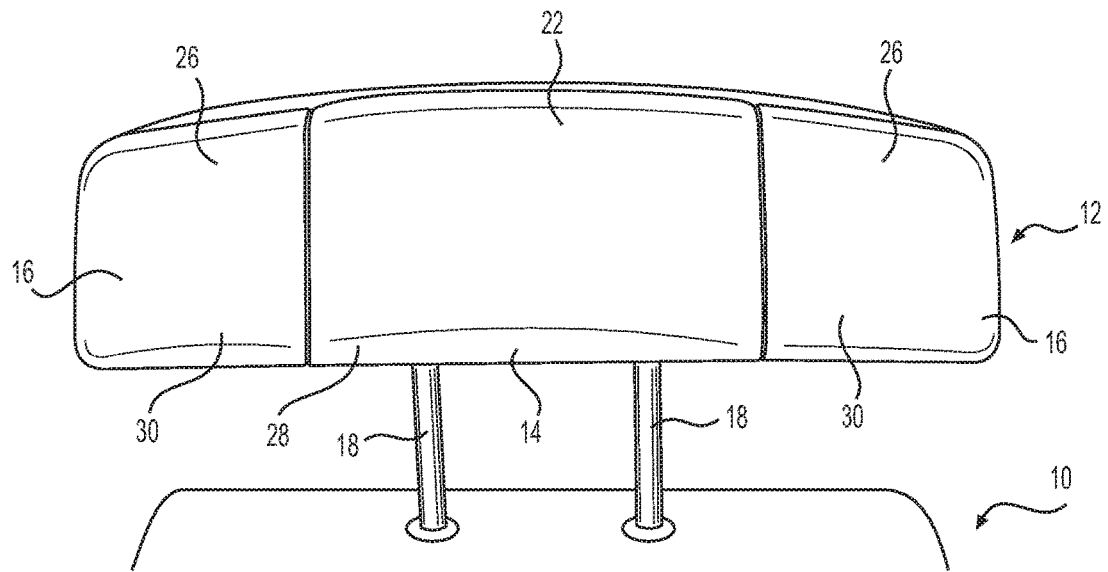
FIG. 1 is a front view of an embodiment of a headrest attached to a portion of a seat according to certain aspects of the present disclosure, with side portions of the headrest in a retracted position.

The present disclosure will now be described in connection with one or more contemplated embodiments. The embodiments that are described are intended to be exemplary of the present disclosure and not limiting of the scope thereof. In other words, while attention is focused on specific embodiments of the present disclosure, those embodiments are not intended to limit the present disclosure. To the contrary, the examples provided below are intended to illustrate the broad scope of the present disclosure. The present disclosure will now be described in connection with one or more contemplated embodiments.

In the paragraphs that follow, the present disclosure will be described in connection with an aircraft seat 10 and its headrest 12. While the details of the aircraft seat 10 and headrest 12 of the present disclosure are discussed in connection with the use of the seat in an aircraft, it is contemplated that the seat of the present disclosure may be employed in any number of suitable environments without departing from the scope of the present disclosure. For example, the seat 10 of the present disclosure may be used on a boat, bus, recreational vehicle, or train, among other contemplated vehicles and environments.

In addition, the discussion that follows will identify specific materials from which the aircraft seat may be constructed. Any identification of a specific material is intended to be exemplary of the types of materials that may be employed to construct the present disclosure. As such, any discussion of specific materials is not intended to be limiting of the present disclosure.

With respect to the seat, there are a number of different aspects and features that are considered to be a part of the present disclosure. The different features and aspects may be combined together or used singly on a seat without departing from the scope of the present disclosure. In other words, the seat of the present disclosure need not incorporate all of the features described herein.

With respect to aircraft, there are a number of different aircraft types that are known in the art. For example, there are commercial aircraft, with which the public is generally familiar. In addition, there are genres of business and private aircraft that are designed for private use, for charter use, or for hire operations.

Also, the particular structure of the seat itself may vary in terms of number and orientations of cushions, underlying structural support, pivot points, etc. Thus, the focus of this disclosure is generally on the headrest with side supports (i.e., "flexwings") that can be employed with various types of seating designs.

For reference, it is noted that an aircraft seat generally provides a user a seating position in which the seat is behind the user and the user faces forward in the seat. Accordingly, in this disclosure unless otherwise noted, references to forward/backward, front/back, top/bottom, middle/side, medial/lateral, etc. are made with reference to seat geometry and not to orientation within a vehicle such as an aircraft. The use of these terms is intended to provide context and not to be limiting of the present disclosure.

FIGS. 1-4 illustrate generally the top portion of seat 10 and headrest 12 with outer coverings of the seat 10 and headrest 12 removed for clarity. Headrest 12 includes a main body portion 14 and two side portions 16. One or more height adjustment members such as rods 18 slidable within seat 10 are attached to main body portion 14 to allow the main body portion 14 to be raised or lowered with respect to the seat 10. Rods 18 may be selectively fixed at various heights relative to seat 10 by a mechanism (not shown) within seat 10 so as to position headrest 12 at a desired height.

Figure 2:
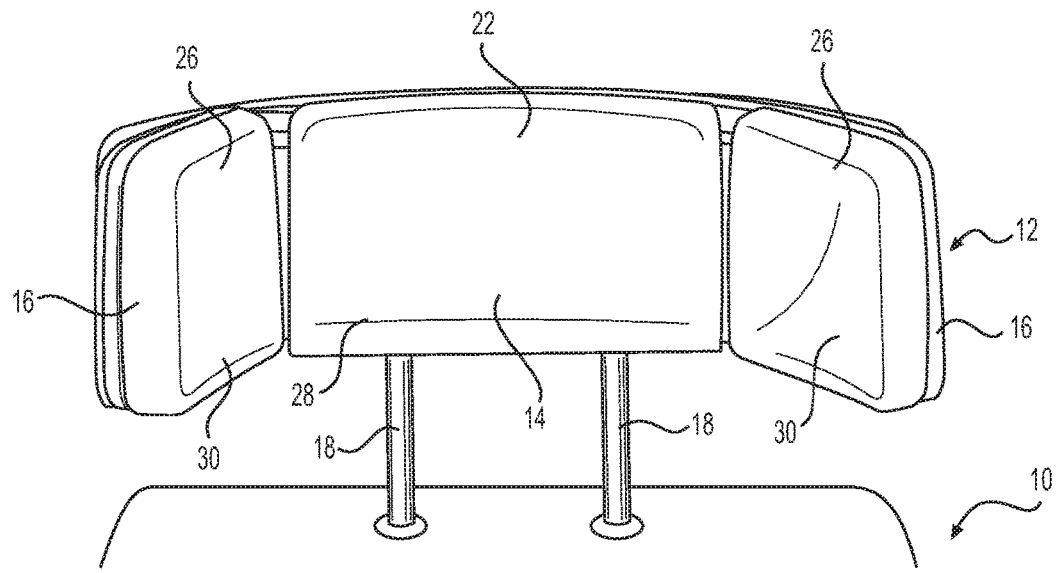
FIG. 2 is front view of the headrest and seat as in FIG. 1 with the side portions moved to an extended (forward) position.
Figure 3:
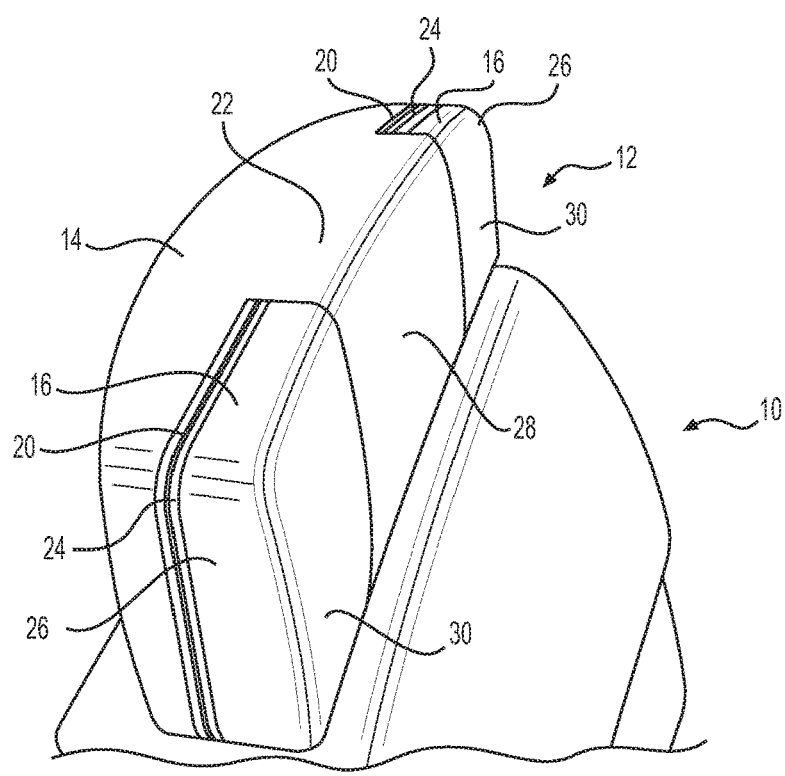
FIG. 3 is an isometric view of the headrest and seat as in FIG. 1.
Figure 4:
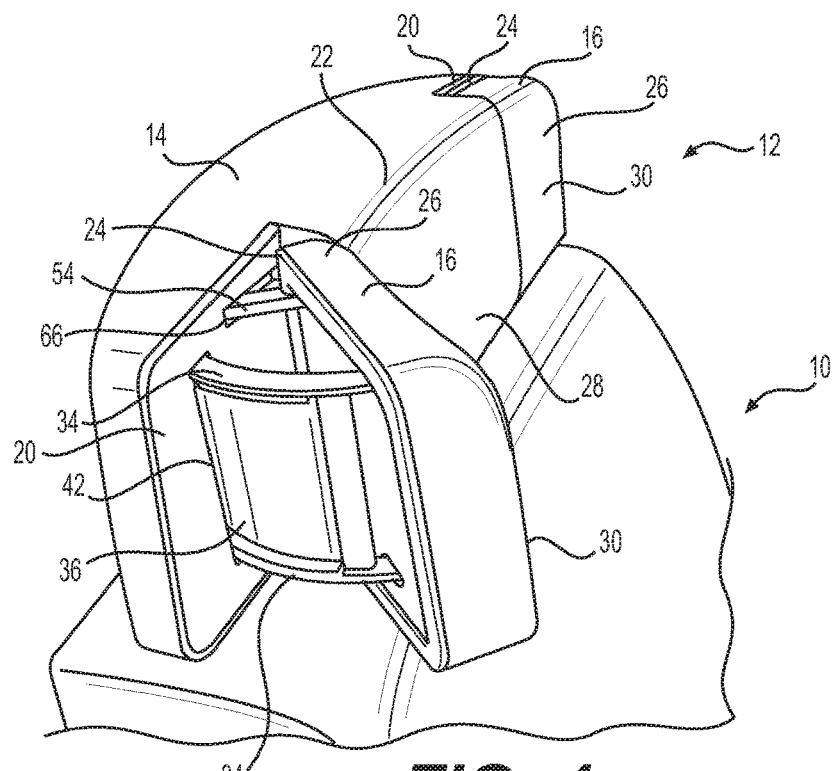
FIG. 4 is an isometric view of the headrest and seat as in FIG. 2.

In FIGS. 1 and 3, side portions 16 are in a retracted position relative to main body portion 14. In FIGS. 2 and 4, side portions 16 are in an extended (forward) position relative to main body portion 14. The structures that provide for such selective positioning will be described below.

In FIGS. 1 and 2, headrest 12 is in a raised position relative to seat 10. In FIGS. 3 and 4, headrest 12 is in a lowered position relative to seat 10. It should be understood that such height adjustment feature is optional. Further, if included, any sort of height adjustment mechanism may be utilized according to the present disclosure.

Main body 14 includes a support structure such as plate 20 (shown in FIG. 3) to which rods 18 are attached directly or indirectly. Main body also includes padding 22 attached to plate 20. The design of plate 20 and padding 22 may vary greatly depending on the application. Thus, various shapes and configurations are possible.

Side portions 16 also include a support structure such as plate 24 and padding 26 attached to the plate 24. Again, it should be noted that the design of plate 24 and padding 26 may also vary greatly depending on the application.

If desired, main body 14 and side portions 16 may be configured so that when the side portions 16 are in a retracted position as in FIG. 3, the headrest 12 forms a substantially continuous body. In particular front surface 28 of main body 14 and front surfaces 30 of side portions 16 may form a substantially continuous surface, which may be substantially planar (as shown) or which alternately may be continuously or partially curved. Thus, different exterior shapes of headrest 12, based on different configurations of main body 14 and side portions 16, are all possible according to the present disclosure.

Figure 8:
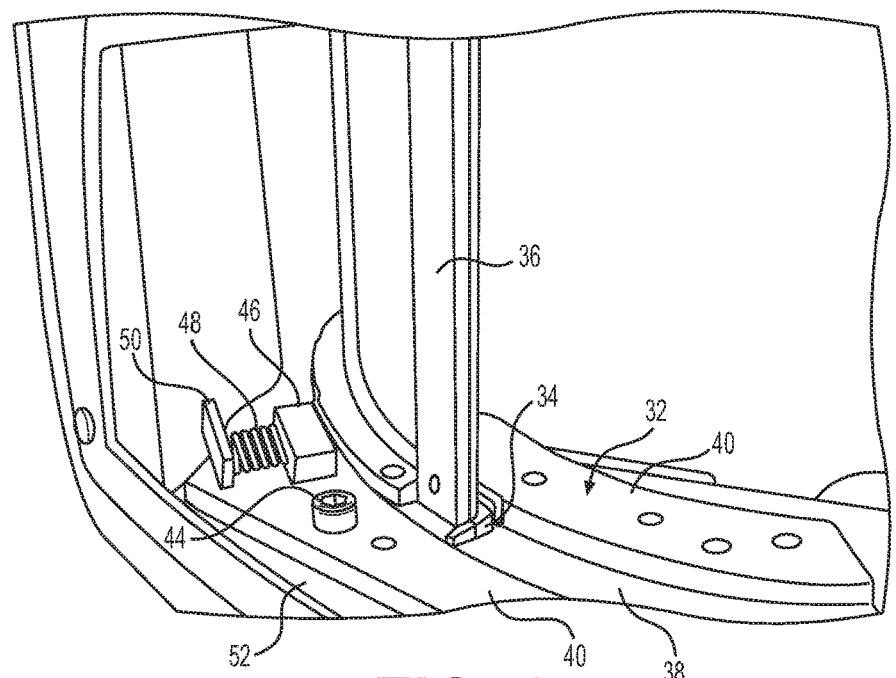
FIG. 8 an a partial isometric view of the headrest as in FIG. 6.

For each side portion 16, at least one receiver 32 (as shown in FIG. 8) is secured to main body 14 for receiving a slide 34 attached to the side portion 16. As illustrated, each side portion 16 includes two slides 34 that each interact with a respective receiver 32 within main body 14. An optional web 36 may extend between slides 34 to provide rigidity. It should be understood that any number of such slides 34 and receivers 32 may be employed according to the present disclosure. Slides 34 are attached to side portions 16 at one end via flanges 64 on plates 24 (see FIGS. 5 and 6) using elements 62 such as fasteners, rivets, pins, rods, etc.

As illustrated, slides 34 are arcuate members and receivers 32 are formed as plates with arcuate channels 38 correspondingly shaped to receive a slide 34. If desired, the receiver 32 could be considered only one or the other of the sides 40, of channel 38, could be another arcuate member (like slide 34), could be an element with a circumferentially shorter extent, etc. Accordingly, the shape of receivers 32 could be modified from that shown within the scope of the present disclosure. Similarly, slides 34 could be given other shapes in length and cross section. One or more openings 42 (see FIG. 4) may be defined though support plate 20 to slidably receive slides 34 and web 36, if present.

Receivers 32 are mounted so as to pivot slightly relative to main body 14. Accordingly, as shown in FIG. 8, receivers 32 are mounted to top or bottom plate 52 of main body 14 via a pivot point 44 such as a fastener, rivet, pin, etc. Allowing receivers 32 to float slightly relative to main body 14 provides a benefit in some circumstances as described below. If two receivers 32 are employed for each side portion 16, mounted respectively above and below two slides 34, the slides will be vertically and horizontally confined within the receivers 32 so as thereby to hold the side portions within main body 14, movable along the slide/receiver path.

Figure 9:
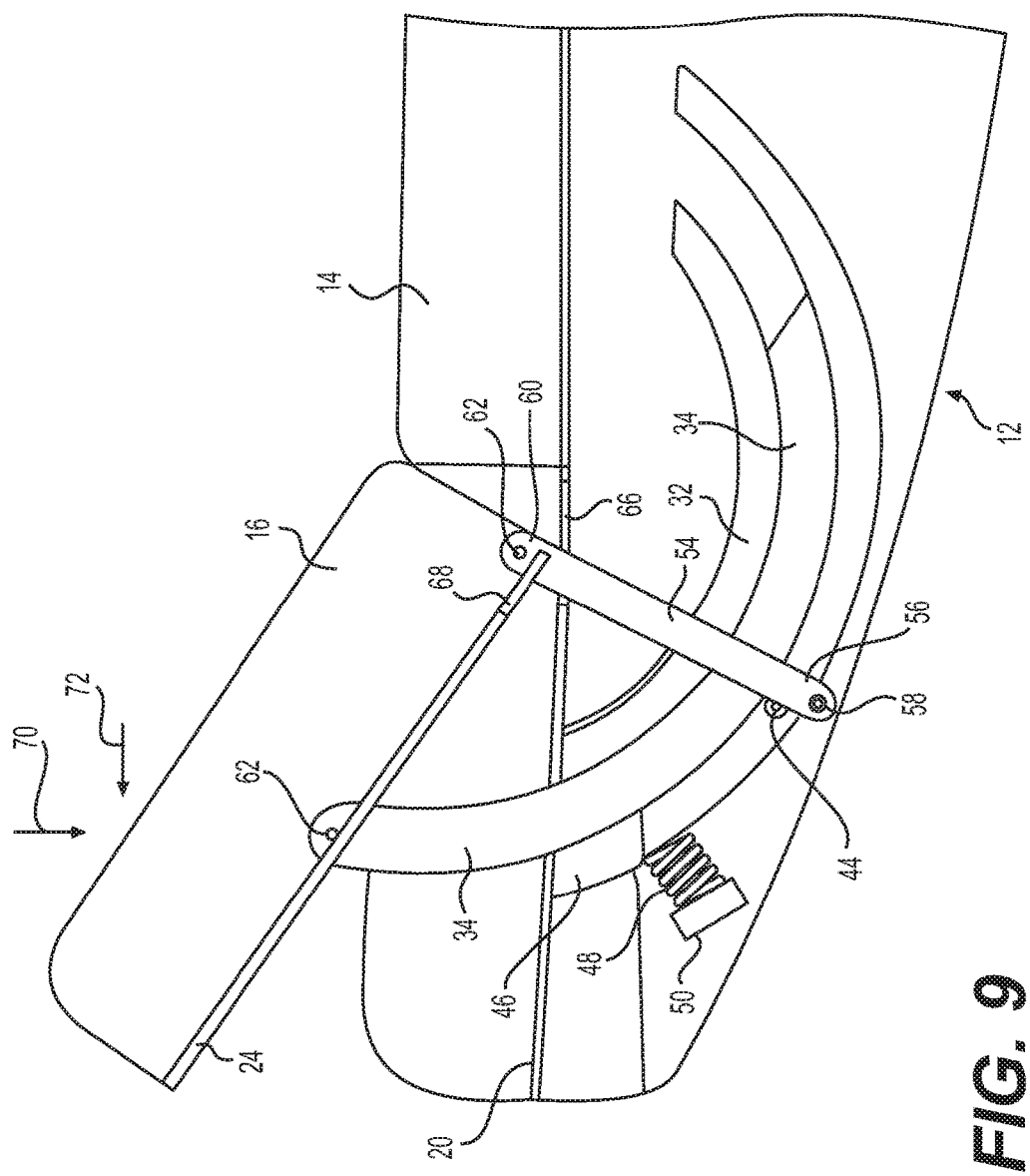
FIG. 9 is a two-dimensional partial diagrammatic view of the headrest, showing the geometry of internal elements used for positioning the side portion relative to the main body.

A friction member 46 such as an element made of a rubber, polymer, etc. may be located on or adjacent one of receiver 32 or slide 34 for selectively holding the slide 34 within receiver 32 at a given position. As illustrated in FIGS. 8 and 9, friction member 46 is an element attached to receiver 32 so as to contact a slide 34. When friction member 46 is activated by urging it into contact with slide 34, the friction member makes it more difficult to move slide 34 relative to receiver 32. Accordingly, when friction member 46 is activated, side portion 16 is held in a given position relative to main body 14. But when friction member 46 is deactivated by releasing it from urged contact with slide 34, the slide (and side portion 16) may move freely with respect to receiver 32 (and main body portion 14).

If desired, a securing mechanism may be employed to selectively activate friction member 46. As illustrated in FIG. 8, a spring member 48 may be mounted within main body 14 to provide a force tending to pivot receiver 32 around pivot point 44 into a position that would activate friction member 46 by urging it toward slide 34. Spring member 48 may be, as illustrated, a coil spring mounted in compression between a block 50 on top or bottom plate 52 and friction member 46 or a holder for it or the like. Spring member 48 may provide force directly through friction member 46 as shown in FIG. 8, or to receiver 34 or slide 32 adjacent friction member 46, as shown in FIG. 9. Alternatively, spring member 48 could be a spring member mounted in tension so as to pull friction member 46 into contact with slide 34. Also, if friction member 46 were mounted on slide 34 instead of receiver, spring member 48 could pull receiver 32 into contact with slide to activate the friction member. Regardless, spring member 48 provides at least some force in a direction substantially normal to receiver 32 proximate to friction member 46.

Figure 5:
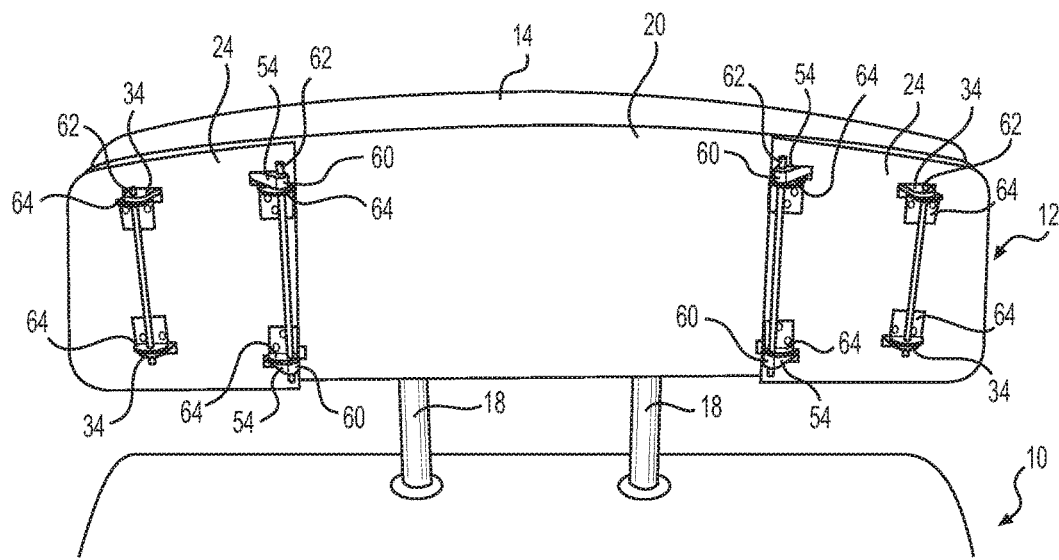
FIG. 5 is a front view of the headrest and seat of FIG. 1, with the padding removed from the front and with the side portions in the retracted position.
Figure 6:
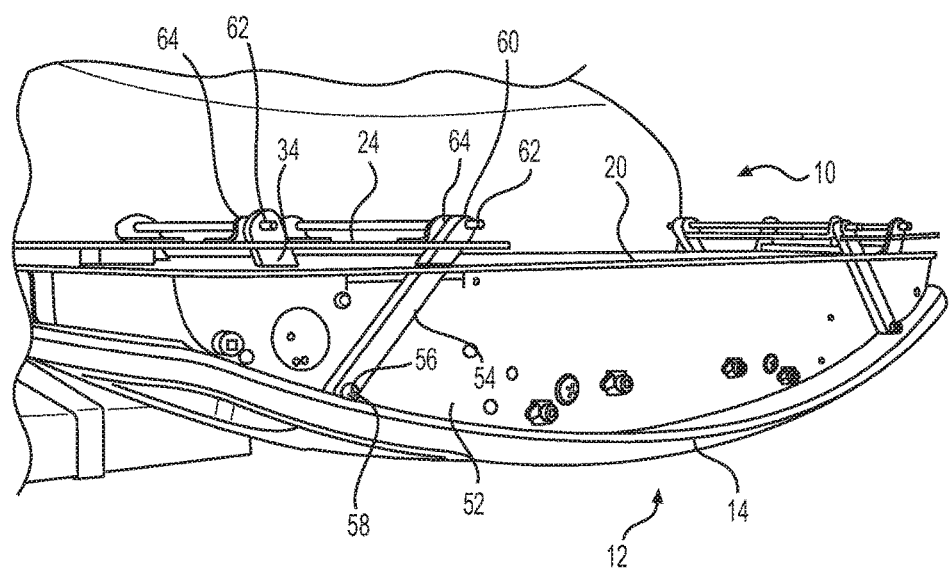
FIG. 6 is a top view of the headrest and seat as in FIG. 5.
Figure 7:
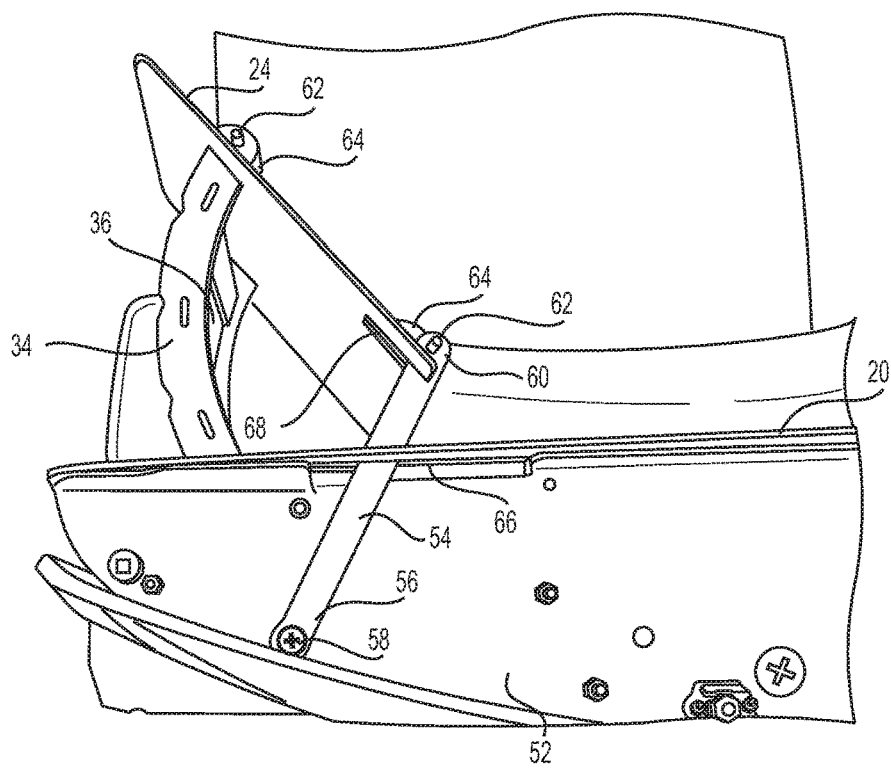
FIG. 7 is a partial top view of the headrest and seat as in FIG. 6, with one side portion in the extended position.

At least one pivot arm 54 is mounted between each side portion 16 and main body 14. Pivot arm 54 is pivotally fixed at a first end 56 to main body 14, for example to top or bottom plate 52, via an element 58 such as a fastener, rivet, pin, rod, etc. Pivot arm 54 is pivotally fixed at a second end 60 to side portion 16, for example via an element 62 such as a fastener, rivet, pin, rod, etc. More specifically, the second end 60 of the pivot arm 54 is connected to the side portion 16 via a connecting element 64 such as a flange extending from support plate 24, as shown in FIGS. 5 and 6. A slot 66 is defined through support plate 20, and a slot 68 is defined through support plate 24 to allow clearance for pivot arm 54 (see FIG. 7).

Pivot arm 54 also partially defines the motion of its side portion 16 relative to main body 14. In particular, movement of a side portion 16 is defined by sliding of its slide(s) 34 relative to receiver(s) 32 and by pivoting of its pivot arm(s) 54 around the first end 56, along with pivoting of the receiver(s) 32 relative to main body 14, but only when the friction member 46 is at least partially deactivated to allow such movement. Side portions 16 thus do not simply pivot around a point of connection between the side portions 16 and main body 14, either along the front surface 28/30 of the headrest or around an internal hinge as in some conventional designs.

In operation (see FIG. 9), if side portion 16 is in the forward position shown and force is applied generally in the direction of arrow 70 to an outer edge of the side portion 16 (as would be typical for a user wishing to move the side portion to a retracted position), force transmitted by slide 34 within receiver 32 in a location internally past friction member 46 will cause receiver 32 to pivot counterclockwise slightly, thereby deactivating the friction member, by removing at least some of the force of the friction member 48 against slide 34. Accordingly, the user may move side portion 16 inwardly toward and to the retracted position of FIG. 1.

Similarly, if force is applied in the direction generally opposite of arrow 70, friction member 46 is also at least partially deactivated as slide 34 is pulled slightly away from contact with friction member 46. Thus, side portion 16 can be readily moved toward and to the forward position. In either case, releasing the force along line 70 reactivates friction member 46, meaning that the friction member 46 is in contact with the slide 34, and holds side portion 16 in its new position. Such directional force along or opposite of line 70 is beneficially intuitive for a user wishing to manipulate a flexwing.

However, if a user provides force generally along a perpendicular line such as is shown by arrow 72, friction member 46 will not be deactivated. In fact, frictional force between friction member 46 and slide 34 (or receiver 32 if reversed) is increased, thereby reliably holding the flexwing in place. Therefore, accidentally or unintentionally applied forces in a more lateral direction are unlikely to allow side portions 16 to move. Again, such operation is beneficially intuitive for users, and can provide comfort and safety improvements in terms of not having the flexwings move when not desired.

The arrangement of at least two of the friction member 46, pivotable receiver 32, and pivot arm 44 thus provides one embodiment of a positioning mechanism that is configured to restrict movement of side portion 16 relative to the body 14 when a force is applied to side portion 16 in a direction not substantially along slide 34. The positioning mechanism may also be configured to permit movement of side portion 16 relative to body 14 when a force is applied to side portion 16 in a direction substantially along slide 34. Also, these elements are active when no force is applied to the side portion, so as to hold side portion 16 in place. Use of spring member 48, while not required in all embodiments, can further assist in the activating and deactivating of each friction member 46.

The present design is such that friction members 46 are deactivated before movement occurs and reactivated once movement stops. Such selective activation may reduce wear on friction members 46 providing a longer service life.

Additionally, in accordance with the present disclosure, side portions 16, their padding 26, and any covering can be made completely separate from the padding and covering of main body 14. Therefore, when the side portions are moved forward, there is no gathering, bunching, or wrinkling of the covering material at the boundaries between the main body and side portions. Elimination of the issues at those locations provides a more comfortable and visually pleasing design.

With respect to the various embodiments described for the present disclosure, features described for one embodiment may be applied to other embodiments without departing from the scope of the present disclosure. Accordingly, the discussion of specific features with respect to one embodiment should not be understood to be limited solely to that embodiment. Also, certain modifications are possible. For example, if desired the securing mechanism may be implemented in a more active system in which, as a first step, the securing mechanism/spring member/etc. is deactivated by pressing a button, activating a linkage, or other mechanical, electromechanical, pneumatic or other means, followed by adjustment of the side portions.

As noted above, the present disclosure encompasses a broad scope. Any discussion of specific details in connection with embodiments is not intended to be limiting of the disclosure. To the contrary, the specific embodiments described above are intended to illustrate the breadth of the present disclosure.

What is claimed is:

1. A headrest for a seat of a vehicle, comprising:
    a body securable to the seat;
    a side portion adjacent the body;
    a receiver pivotally attached to the body;
    a slide attached to the side portion so as to be movable along the receiver between a first position in which the side portion is in a retracted position and a second position in which the side portion is in an extended position;
    a friction member on one of the receiver and the slide; and
    a securing mechanism attached to the body for causing the friction member to hold the slide in a selected position relative to the receiver.

2. The headrest of claim 1, wherein the slide is arcuate.

3. The headrest of claim 2, wherein the receiver is arcuate.

4. The headrest of claim 2, wherein the receiver includes two arcuate members on opposite sides of the slide.

5. The headrest of claim 1, wherein the securing mechanism includes a spring member.

6. The headrest of claim 5, wherein the spring member provides a force urging the receiver to pivot around a pivot point spaced from the spring member.

7. The headrest of claim 5, wherein the spring member provides a force substantially normal to the receiver proximate the friction member.

8. The headrest of claim 1, wherein the body has a front surface and the side portion has a front surface, the front surfaces of the body and side portion being substantially planar when the side portion is in the retracted position and the front surface of the side portion being at an angle to the front surface of the body when the side portion is in the extended position.

9. The headrest of claim 1, wherein the side portion comprises a first side portion, the receiver comprises a first receiver, the slide comprises a first slide and the securing mechanism comprises a first securing mechanism all located on a first lateral side of the body, the headrest further comprising a second side portion, a second receiver, a second slide and a second securing mechanism all located on a second lateral side of the body.

10. The headrest of claim 9, wherein the first and second side portions are independently movable relative to the body.

11. The headrest of claim 1, further including a pivot arm having a first end attached to the side portion and a second end attached to the body spaced from a front surface of the body, the side portion pivoting relative to the body via the pivot arm when the slide moves relative to the receiver.

12. A headrest for a seat of a vehicle comprising:
a body securable to the seat;
a side portion adjacent the body;
a receiver attached to the body;
a slide attached to the side portion so as to be movable along the receiver between a first position in which the side portion is in a retracted position and a second position in which the side portion is in an extended position, the slide being arcuate; and
a pivot arm having a first end attached to the side portion and a second end attached to the body spaced from a front surface of the body, the side portion pivoting relative to the body via the pivot arm when the slide moves relative to the receiver.

13. The headrest of claim 12, wherein the receiver is arcuate.

14. The headrest of claim 12, wherein the receiver includes two arcuate members on opposite sides of the slide.

15. The headrest of claim 12, further including a securing mechanism attached to the body for urging together the slide and the receiver to hold the slide in a position relative to the receiver.

16. The headrest of claim 15, wherein the securing mechanism includes a spring member providing a force substantially normal to the receiver.

17. The headrest of claim 12, wherein the side portion has a front surface, the front surfaces of the body and side portion being substantially planar when the side portion is in the retracted position and the front surface of the side portion being at an angle to the front surface of the body when the side portion is in the extended position.

18. The headrest of claim 12, wherein the side portion comprises a first side portion, the receiver comprises a first receiver, the slide comprises a first slide and the pivot arm comprises a first pivot arm all located on a first lateral side of the body, the headrest further comprising a second side portion, a second receiver, a second slide and a second pivot arm all located on a second lateral side of the body.

19. The headrest of claim 18, wherein the first and second side portions are independently movable relative to the body.

20. A headrest for a seat of a vehicle, comprising:
a body securable to the seat;
a side portion adjacent the body;
a receiver pivotally attached to the body;
a slide attached to the side portion so as to be movable along the receiver between a first position in which the side portion is in a retracted position and a second position in which the side portion is in an extended position; and
a positioning mechanism configured to restrict movement of the side portion relative to the body when a force is applied to the side portion in a direction not substantially along the slide.

21. The headrest of claim 20, wherein the positioning mechanism includes a securing mechanism attached to the body for urging together the slide and the receiver to hold the slide in a position relative to the receiver.

22. The headrest of claim 21, wherein the securing mechanism includes a spring member providing a force substantially normal to the receiver.

23. The headrest of claim 21, wherein the positioning mechanism further includes a friction member on one of the receiver and the slide for holding the slide relative to the receiver when the securing mechanism is active.

24. The headrest of claim 20, wherein the slide is arcuate.

25. The headrest of claim 24, wherein the receiver is arcuate.

26. The headrest of claim 24, wherein the receiver includes two arcuate members on opposite sides of the slide.

27. The headrest of claim 20, wherein the side portion has a front surface, the front surfaces of the body and side portion being substantially planar when the side portion is in the retracted position and the front surface of the side portion being at an angle to the front surface of the body when the side portion is in the extended position.

28. The headrest of claim 20, wherein the side portion comprises a first side portion, the receiver comprises a first receiver, the slide comprises a first slide all located on a first lateral side of the body, the headrest further comprising a second side portion, a second receiver and a second slide all located on a second lateral side of the body.

29. The headrest of claim 20, further including a pivot arm having a first end attached to the side portion and a second end attached to the body spaced from a front surface of the body, the side portion pivoting relative to the body via the pivot arm when the slide moves relative to the receiver.

30. The headrest of claim 20, wherein the positioning mechanism configured to permit movement of the side portion relative to the body when a force is applied to the side portion in a direction substantially along the slide.

* * * * *